United States Patent
Ikeda et al.

(10) Patent No.: US 10,217,986 B2
(45) Date of Patent: Feb. 26, 2019

(54) BATTERY CONNECTION BODY AND BATTERY PACK PROVIDED WITH THE BATTERY CONNECTION BODY

(71) Applicant: YAZAKI CORPORATION, Tokyo (JP)

(72) Inventors: Tomohiro Ikeda, Kakegawa (JP); Koji Koizumi, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 552 days.

(21) Appl. No.: 14/689,171

(22) Filed: Apr. 17, 2015

(65) Prior Publication Data
US 2015/0303435 A1    Oct. 22, 2015

(30) Foreign Application Priority Data
Apr. 18, 2014    (JP) .................................. 2014-086165

(51) Int. Cl.
*H01M 2/20*    (2006.01)
*H01M 2/10*    (2006.01)

(52) U.S. Cl.
CPC ......... *H01M 2/206* (2013.01); *H01M 2/1077* (2013.01); *H01M 2220/20* (2013.01)

(58) Field of Classification Search
CPC . H01M 2220/20; H01M 2/1077; H01M 2/206
See application file for complete search history.

(56) References Cited

U.S. PATENT DOCUMENTS

2010/0055993 A1\* 3/2010 Ikeda .................. H01M 2/1077
439/754
2011/0064987 A1 3/2011 Ogasawara et al.
(Continued)

FOREIGN PATENT DOCUMENTS

CN    102916152 A    2/2013
CN    102947971 A    2/2013
(Continued)

OTHER PUBLICATIONS

Office Action dated Dec. 19, 2016, by the State Intellectual Property Office of P.R. China in counterpart Chinese Application No. 201510188601.4.

*Primary Examiner* — Barbara L Gilliam
*Assistant Examiner* — Adam A Arciero
(74) *Attorney, Agent, or Firm* — Sughrue Mion, PLLC

(57) ABSTRACT

A battery connection body includes: connection conductors which electrically connect respective battery cells forming a battery assembly; a casing to which the connection conductors are mounted, and which includes a first side and a second side different from the first side; and first electric wires and second electric wires, which are wired in the casing. The casing includes: a connection conductor mounting portion; a first electric wire housing portion; and a second electric wire housing portion. The connection conductors are mounted to the connection conductor mounting portion from the first side of the casing. The first electric wires are received into the first electric wire housing portion from the first side of the casing. The second electric wires are received into the second electric wire housing portion from the second side of the casing.

11 Claims, 8 Drawing Sheets

(56) References Cited

U.S. PATENT DOCUMENTS

| | | | |
|---|---|---|---|
| 2011/0076521 A1* | 3/2011 | Shimizu | H01M 2/1061 429/7 |
| 2012/0322320 A1* | 12/2012 | Takase | H01M 2/1077 439/732 |
| 2013/0344377 A1 | 12/2013 | Ogasawara et al. | |

FOREIGN PATENT DOCUMENTS

| | | |
|---|---|---|
| JP | 201165863 A | 3/2011 |
| JP | 2014-022256 A | 2/2014 |
| WO | 2014/014000 A1 | 1/2014 |

\* cited by examiner

BATTERY CONNECTION BODY AND BATTERY PACK PROVIDED WITH THE BATTERY CONNECTION BODY

CROSS REFERENCE TO RELATED APPLICATION(S)

This application is based on and claims priority from Japanese Patent Application (Application No. 2014-086165) filed on Apr. 18, 2014, the entire contents of which are incorporated herein by reference.

BACKGROUND

1. Field of the Invention

One or more embodiments of the present invention relate to a battery connection body for electrically connecting battery cells forming a battery assembly, and a battery pack provided with the battery connection body.

2. Description of the Related Art

JP-A-2014-22256 describes a car mounted with a battery pack. The battery pack includes: a battery assembly that is an assembly of a plurality of battery cells; and a battery connection body attached to the battery assembly so as to electrically connect the battery cells with one another.

For example, the battery connection body includes: a plurality of connection conductors each connecting the adjacent battery cells of the battery assembly to each other; a plurality of first electric wires such as voltage detection lines for detecting voltages of the battery cells; a plurality of second electric wires such as thermistor lines for detecting temperatures of the battery cells; and a synthetic resin casing to which those components are attached. In addition, the first electric wires and the second electric wires are housed in a gutter-like electric wire housing portion provided in the casing.

SUMMARY

In the battery connection body, a first voltage is applied to the first electric wires, and a second voltage lower than the first voltage is applied to the second electric wires. Further, the first electric wires and the second electric wires are housed in the same electric wire housing portion. Accordingly, the first and second electric wires are brought into close contact with each other, whereby noise from the first electric wires may be superposed on the second electric wires, which affects the second electric wires. As a measure for the noise propagation, it is considered that a partition wall is provided to stand from a bottom wall in the gutter-like electric wire housing portion so as to divide the inside thereof into a space receiving the first electric wires and a space receiving the second electric wires. However, when such a structure is used, the spaces adjacent to each other are open in the same direction, so that the work of wiring the first electric wires and the second electric wires may become troublesome or those electric wires may be wired wrongly.

An object of one of more embodiments of the invention is to provide a battery connection body capable of preventing noise propagation from first electric wires to second electric wires from occurring easily and capable of easily performing work of wiring the first electric wires and the second electric wires, and a battery pack provided with the battery connection body.

In a first aspect of the invention, there is provided a battery connection body including: a plurality of connection conductors which electrically connect respective battery cells forming a battery assembly; a casing to which the connection conductors are mounted, and which includes a first side and a second side different from the first side; and a plurality of first electric wires and a plurality of second electric wires, which are wired in the casing, wherein the casing includes: a connection conductor mounting portion; a first electric wire housing portion; and a second electric wire housing portion, wherein the connection conductors are mounted to the connection conductor mounting portion from the first side of the casing, wherein the first electric wires are received into the first electric wire housing portion from the first side of the casing, and wherein the second electric wires are received into the second electric wire housing portion from the second side of the casing.

In a second aspect of the invention, there is provided the battery connection body according to the first aspect, wherein the first side of the casing is a back side of the casing, and wherein the second side of the casing is a front side of the casing.

In a third aspect of the invention, there is provided the battery connection body according to the first or second aspect, wherein the first electric wire housing portion and the second electric wire housing portion are provided adjacently to each other, and wherein the first electric wire housing portion and the second electric wire housing portion are defined by a part of the casing.

In a fourth aspect of the invention, there is provided the battery connection body according to any one of the first to third aspects, wherein the first electric wires are connected to the connection conductors.

In a fifth aspect of the invention, there is provided a battery pack including: the battery connection body according to any one of the first to fourth aspects; and the battery assembly in which the battery cells are electrically connected by the battery connection body.

In a sixth aspect of the invention, there is provided the battery pack according to the fifth aspect, wherein the first electric wire housing portion has a gutter-like shape with an opening portion that is open on the first side of the casing, and wherein the opening portion is closed with the battery assembly.

According to the first or fifth aspect of the invention, the first electric wire housing portion and the second electric wire housing portion are provided in the casing. Therefore, the first electric wires and the second electric wires can be separated from each other so that noise propagation from the first electric wires to the second electric wires can be prevented from occurring easily. In addition, due to the structure in which the first electric wires are received into the first electric wire housing portion from the first side of the casing and the second electric wires are received into the second electric wire housing portion from the second side of the casing, those electric wires can be wired in the respective housing portions easily and surely. It is therefore possible to prevent wrong wiring.

According to the second aspect of the invention, the first electric wires received into the first electric wire housing portion from the back side of the casing are not exposed to the front side of the casing. Therefore, a cover or the like for covering the first electric wires does not have to be provided on the front side of the casing. Thus, the structure of the battery connection body can be simplified.

According to the third aspect of the invention, the first electric wire housing portion and the second electric wire housing portion are provided adjacently to each other while the first electric wire housing portion and the second electric wire housing portion are defined by a part of the casing. It is therefore possible to miniaturize and simplify the casing.

According to the fourth aspect of the inventions, the first electric wires are connected to the connection conductors, and the connection conductors and the first electric wires are attached to the casing from the same direction. Due to this structure, it is possible to perform the work of assembling the battery connection body easily.

According to the sixth aspect of the invention, the first electric wire housing portion has a gutter-like shape with an opening portion that is open on the first side of the casing, and the opening portion is closed with the battery assembly. A cover or the like for covering the first electric wires does not have to be provided either on the front side of the casing or on the first side of the same. Thus, the structure of the battery connection body can be simplified.

DETAILED DESCRIPTION

A "battery connection body" and a "battery pack" according to an embodiment of the invention will be described with reference to FIGS. 1 to 6B.

Figure 1:
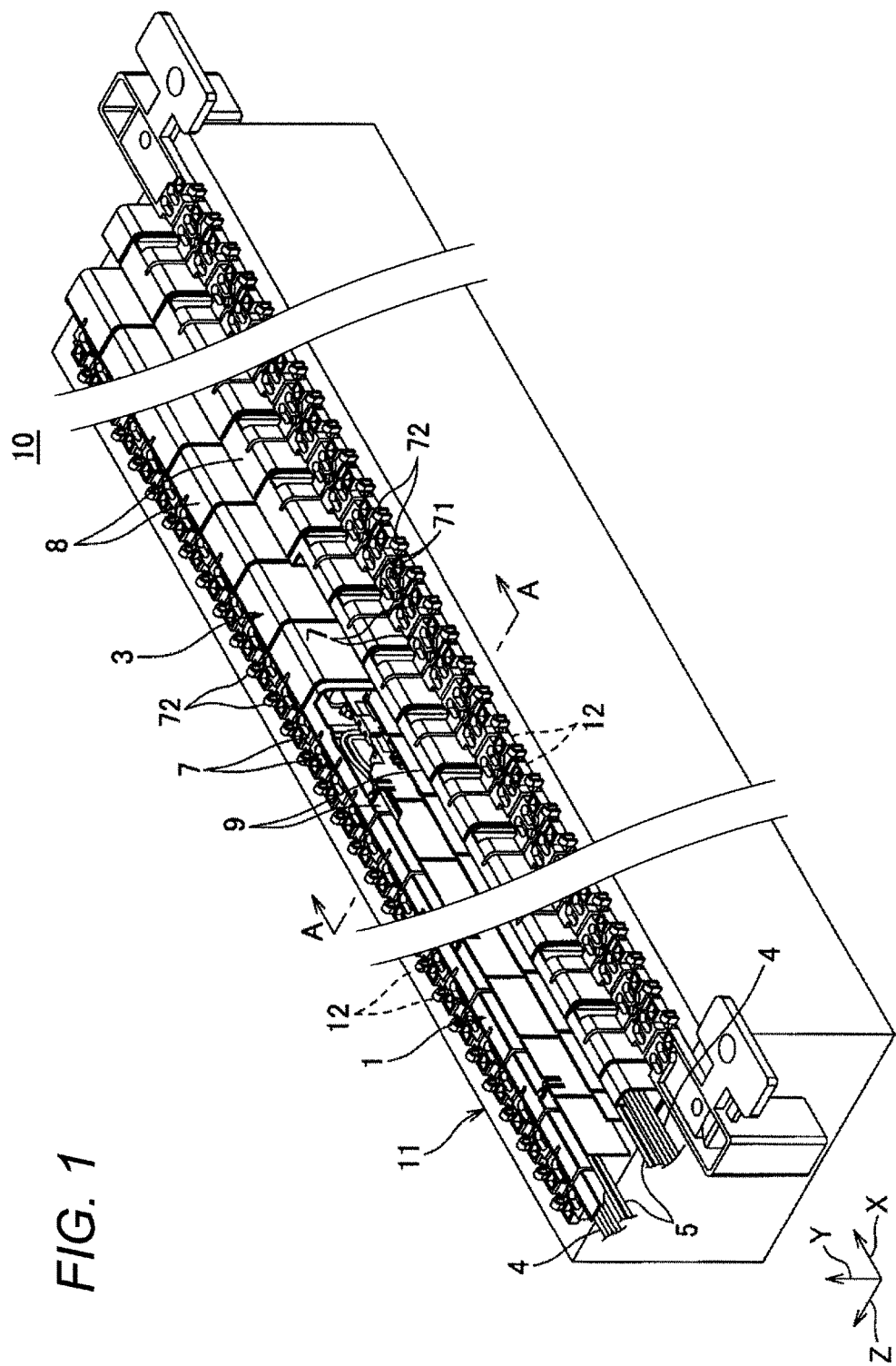
FIG. 1 is a perspective view of a battery connection body and a battery pack according to an embodiment of the invention.

A battery pack 10 shown in FIG. 1 is mounted on a car. The battery pack 10 includes a battery assembly 11 that is an assembly of a plurality of battery cells, a not-shown monitoring unit that monitors the state of the battery assembly 11, a battery connection body 1 that electrically connects the battery cells of the battery assembly 11 to one another and connects the battery assembly 11 and the monitoring unit to each other, and a not-shown housing that accommodates the battery assembly 11 and the battery connection body 1.

In FIG. 1, a plurality of battery cells are arranged in the arrow X direction in the battery assembly 11. In each battery cell, a pair of electrodes are provided on the side (upper side in the arrow Y direction) where the battery connection body 1 is attached. The pair of electrodes includes a positive electrode and a negative electrode, one of which is provided at one end in the arrow Z direction while the other is provided at the other end in the arrow Z direction.

In the battery assembly 11, the battery cells are arranged alternately reversely so that adjacent electrodes of adjacent ones of the battery cells have different polarities. In the battery assembly 11, positive electrodes and negative electrodes of adjacent ones of the battery cells are connected by connection conductors 12, which will be described later, respectively so that the battery cells can be connected in series.

The battery connection body 1 has a plurality of connection conductors 12 that connect the battery cells of the battery assembly 11 in series, a plurality of voltage detection lines 4 (serving as an example of the "first electric wires") that connect the connection conductors 12 to the monitoring unit respectively, a plurality of thermistors 6 that detect temperatures of predetermined ones of the battery cells, a plurality of thermistor lines 5 (serving as an example of the "second electric wires") that connect the thermistors 6 to the monitoring unit respectively, and a casing 3 to which those members are attached.

Figure 2:
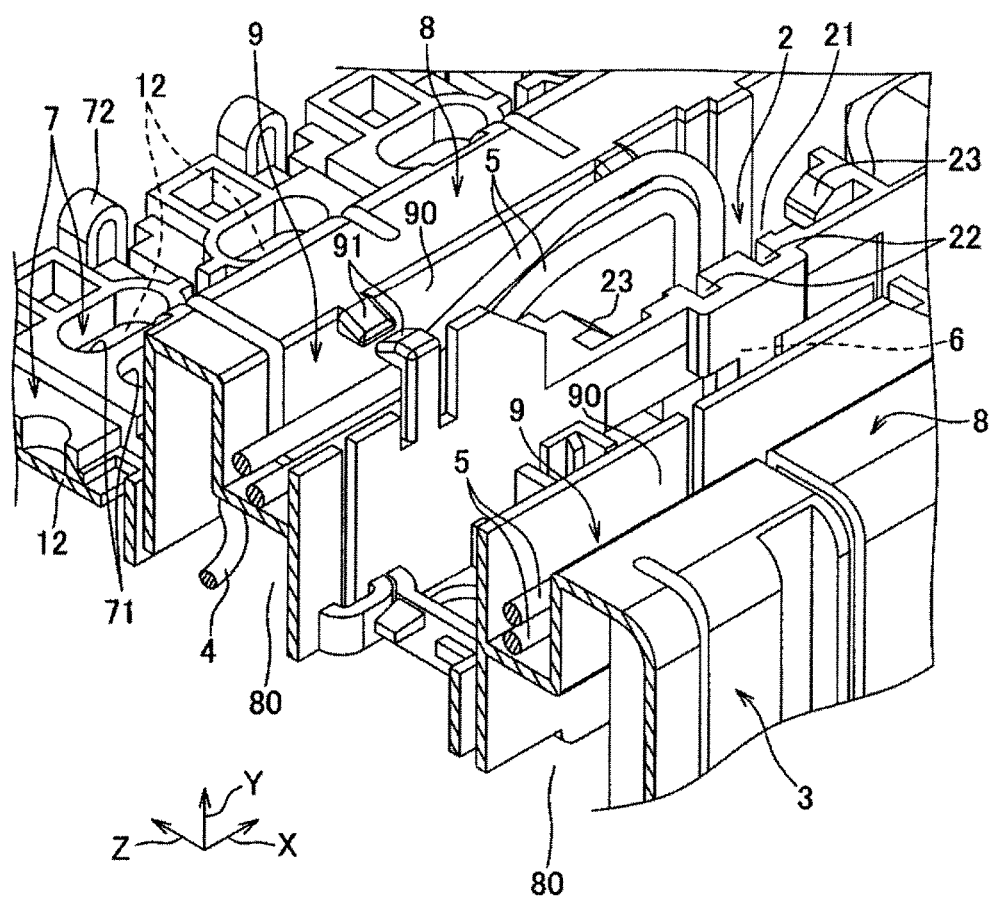
FIG. 2 is a sectional perspective view of the battery connection body taken along a line A-A shown in FIG. 1.

Each connection conductor 12 is obtained from a metal plate subjected to press working, and formed into a plate-like shape (see FIG. 2). The connection conductor 12 is placed on electrodes of adjacent ones of the battery cells and laser-welded thereto.

The voltage detection lines 4 are electric wires for detecting voltages of the battery cells respectively. The voltage detection lines 4 are connected to the connection conductors 12 directly or through terminals or the like respectively.

Figure 4:
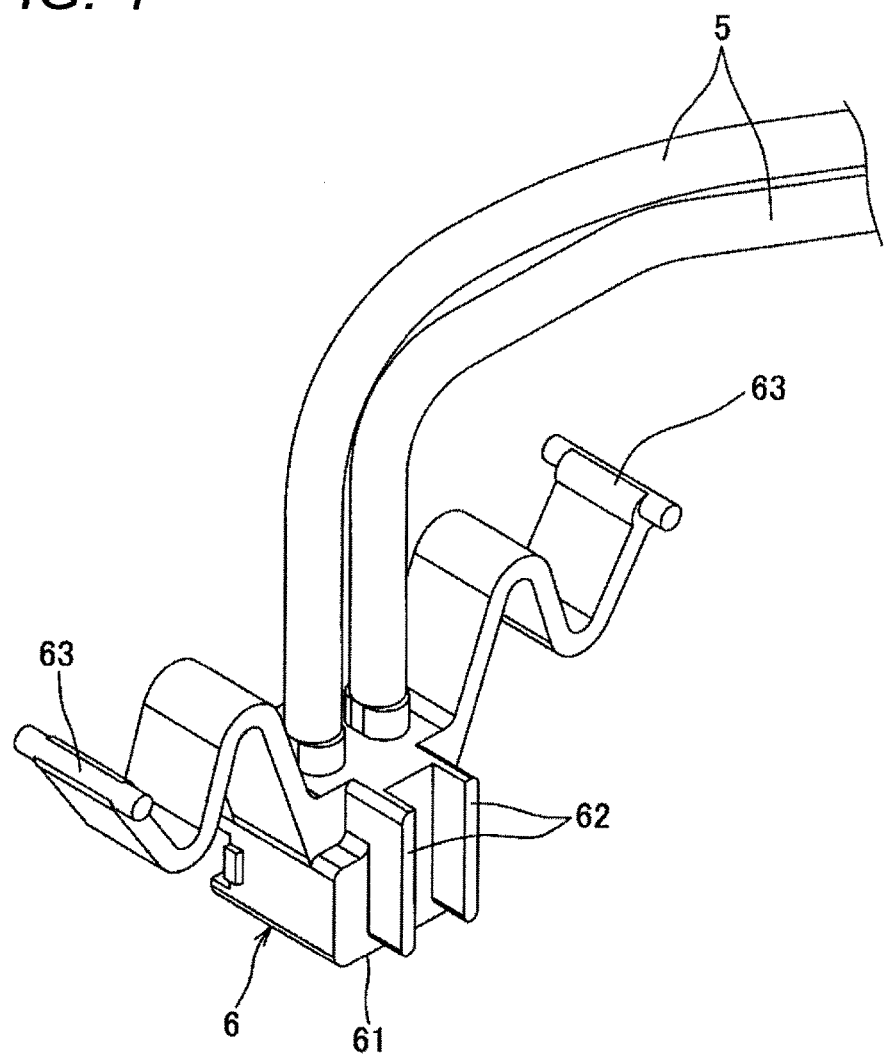
FIG. 4 is a perspective view of a thermistor forming the battery connection body shown in FIG. 1.

As shown in FIG. 4, each thermistor 6 includes a body portion 61 that has a thermistor element internally, two guide ribs 62 that are provided on one side surface of the body portion 61, and a pair of elastic arms 63 that extend from the external surface of the body portion 61 so as to be separated from each other. In addition, two thermistor lines 5 are connected to the thermistor element.

The thermistor lines 5 are electric wires that are connected to the thermistors 6 as described above. A lower voltage than the maximum value in the voltage detection lines 4 is applied to each thermistor line 5.

The casing 3 is made of insulating synthetic resin. The casing 3 is provided with connection conductor mounting portions 7 in which the connection conductors 12 are mounted, voltage detection line housing portions 8 (serving as an example of the "first electric wire housing portion") in which the voltage detection lines 4 are housed, thermistor line housing portions 9 (serving as an example of the "second electric wire housing portion") in which the thermistor lines 5 are housed, and thermistor mounting portions 2 in which the thermistors 6 are mounted.

Each connection conductor mounting portion 7 is provided for one connection conductor 12. The connection conductor mounting portion 7 is provided like a plate, and a through hole 71 is formed therein. As shown in FIG. 2, the connection conductor 12 is mounted on the back side of the connection conductor mounting portion 7. The through hole 71 is a hole through which the connection conductor 12 mounted on the back side of the connection conductor mounting portion 7 can be irradiated with laser light from the front side of the connection conductor mounting portion 7. The connection conductor mounting portions 7 configured thus are provided in the direction in which the battery cells of the battery assembly 11 are arranged. In addition, adjacent ones of the connection conductor mounting portions 7 are connected to each other through a thin hinge 72.

Figure 3:
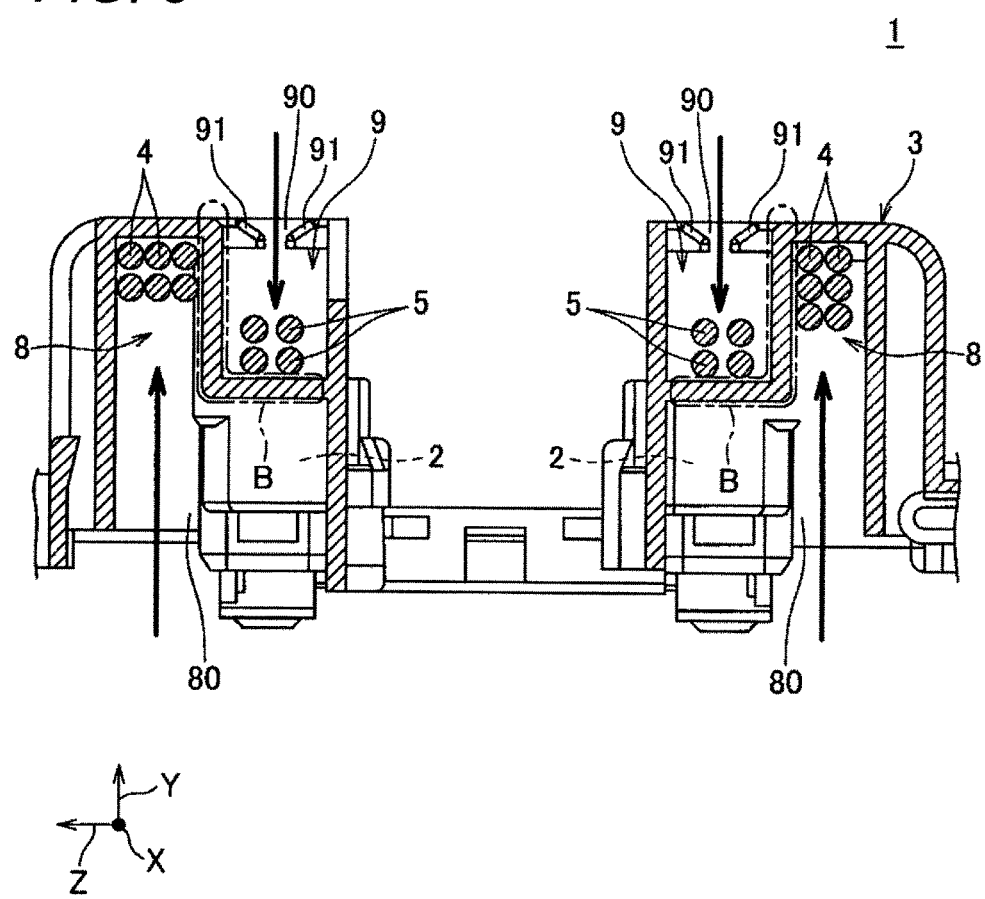
FIG. 3 is a sectional view of the battery connection body taken along the line A-A shown in FIG. 1.

As shown in FIGS. 2 and 3, each voltage detection line housing portion 8 is formed into a gutter-like shape with an opening portion 80 that is open on the back side (an example of a first side) of the casing 3. The voltage detection line housing portion 8 extends in the direction in which the battery cells of the battery assembly 11 are arranged. The voltage detection lines 4 are received into the voltage detection line housing portion 8 from the opening portion 80, that is, the back side of the casing 3. In addition, when the battery connection body 1 is fixed to the battery assembly 11, the opening portion 80 of the voltage detection line housing portion 8 is closed with the battery assembly 11. As used herein, the term "back side of the casing 3" means the side where the casing 3 is placed on the battery assembly 11.

As shown in FIGS. 2 and 3, each thermistor line housing portion 9 is formed into a gutter-like shape with an opening portion 90 that is open on the front side (an example of a second side different from the first side) of the casing 3. The thermistor line housing portion 9 extends in the direction in which the battery cells of the battery assembly 11 are arranged. The thermistor lines 5 are received into the thermistor line housing portion 9 from the opening portion 90, that is, the front side of the casing 3. In addition, flexible claws 91 for restricting the thermistor lines 5 housed in the thermistor line housing portion 9 so as to prevent the thermistor lines 5 from emerging outside the thermistor line housing portion 9 from the opening portion 90 are provided in the thermistor line housing portion 90. The flexible claws 91 are paired and arranged at a plurality of places in the longitudinal direction of the thermistor line housing portion 9. Each pair of flexible claws 91 extend to approach each other from a pair of inner opposite faces of the thermistor line housing portion 9. When the thermistor lines 5 are wired in the thermistor line housing portion 9, the thermistor lines 5 are pushed into and wired between each pair of flexible claws 91 so as to elastically deform the pair of flexible claws 91.

The voltage detection line housing portion 8 and the thermistor line housing portion 9 are provided adjacently to each other. In addition, the voltage detection line housing portion 8 and the thermistor line housing portion 9 are defined (divided) by a part of the casing 3 (portion B in FIG. 3). That is, a part of a wall defining the voltage detection line housing portion 8 forms a part of a wall defining the thermistor line housing portion 9.

Figure 5:
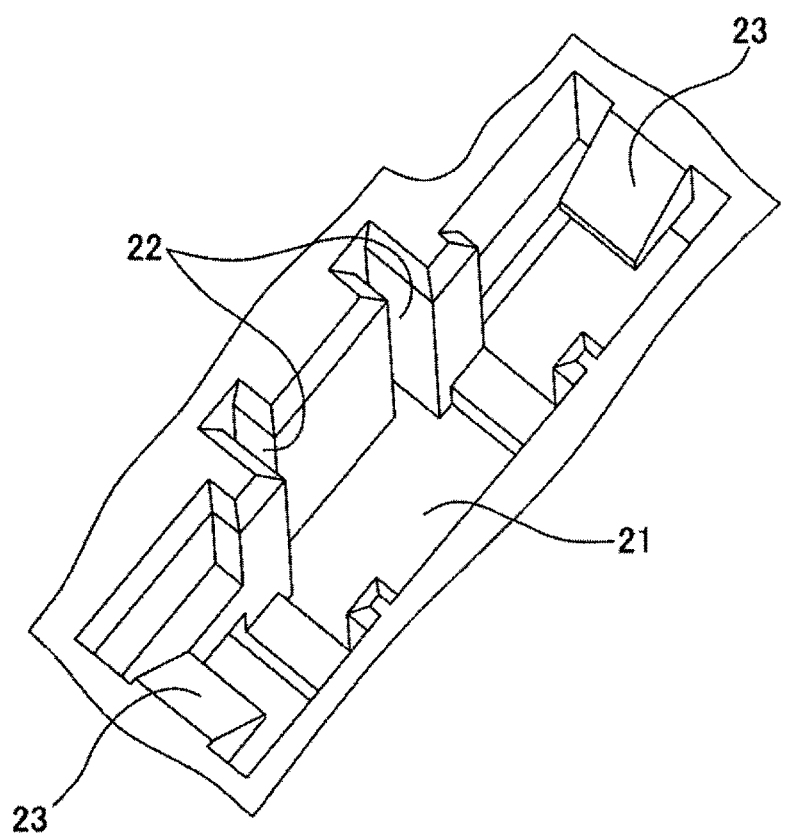
FIG. 5 is a perspective view of a thermistor mounting portion of the battery connection body shown in FIG. 1.

The thermistor mounting portions 2 are provided to be recessed from the bottom wall of the thermistor line housing portion 9 and arranged at a plurality of places in the longitudinal direction of the thermistor line housing portion 9. As shown in FIG. 5, each thermistor mounting portion 2 includes a recess portion 21 that is formed to be recessed from the bottom wall of the thermistor line housing portion 9 so as to receive a thermistor 6, two guide grooves 22 that are formed in the inner surface of the recess portion 21, and a pair of holding claws 23 that hold a pair of elastic arms 63 in the state where the thermistor 6 is housed in the recess portion 21.

Figure 6A:
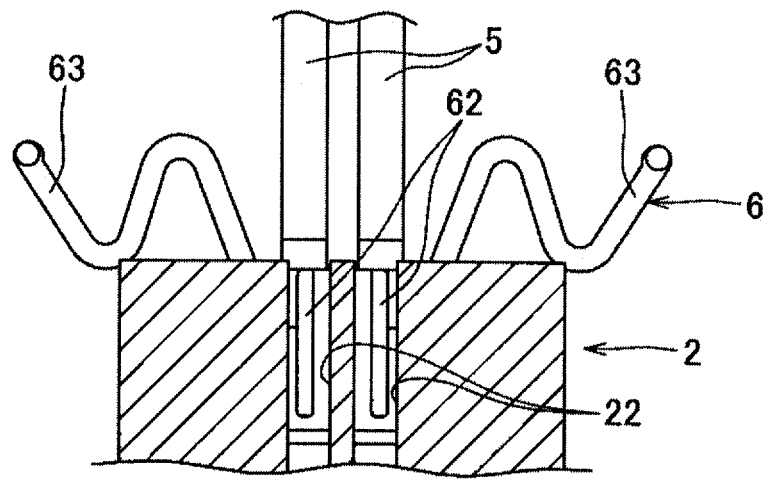
FIGS. 6A and 6B are explanatory views for explaining states where the thermistor shown in FIG. 4 is mounted in the thermistor mounting portion shown in FIG. 5.
Figure 6B:
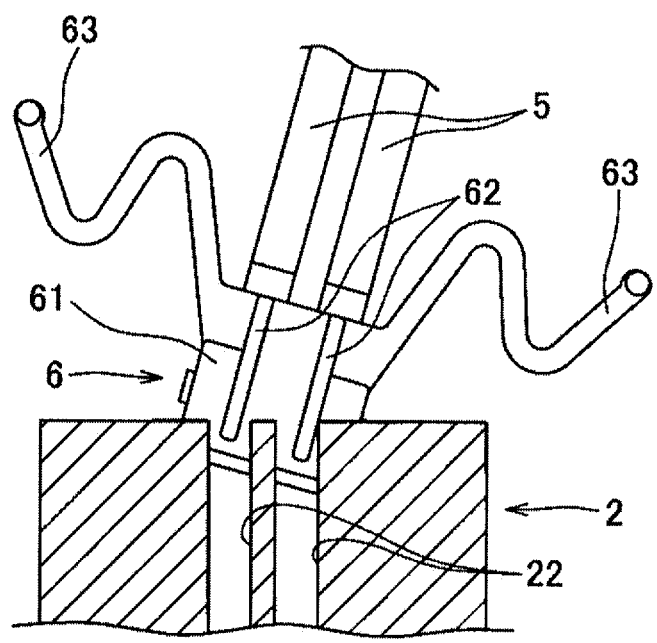

As shown in FIG. 6A, each thermistor 6 is mounted on a thermistor mounting portion 2 with two guide ribs 62 being positioned in two guide grooves 22. Incidentally, a background-art product has a structure in which each thermistor is provided with one guide rib 62 and each thermistor mounting portion is provided with one guide groove 22. Therefore, when the thermistor is inserted, the thermistor may be inclined so that the thermistor cannot be inserted straightly to the thermistor mounting portion. The battery connection body 1 has a structure in which each thermistor 6 is provided with two guide ribs 62 and each thermistor mounting portion 2 is provided with two guide grooves 22. Therefore, as shown in FIG. 6B, the inclination of the thermistor 6 can be corrected so that the thermistor 6 can be inserted straightly to the thermistor mounting portion 2.

As shown in FIG. 1, the battery connection body 1 is provided with two lines of a plurality of connection conductor mounting portions 7 arranged in the arrow X direction. In addition, two lines of voltage detection line housing portions 8 are provided inside the two lines of connection conductor mounting portions 7. Further inside the two lines of voltage detection line housing portions 8, two lines of thermistor line housing portions 9 are provided.

Next, the procedure of assembling the battery connection body 1 will be described. First, the casing 3 is turned with its back side out, and the connection conductors 12 are mounted into the connection conductor mounting portions 7 from the back side of the casing 3. Next, the voltage detection lines 4 are wired in the voltage detection line housing portions 8 from the back side of the casing 3 and the voltage detection lines 4 are connected to the connection conductors 12. Next, the casing 3 is turned with its front side out, and the thermistor lines 5 are wired into the thermistor line housing portions 9 from the front side of the casing 3 while the thermistors 6 are mounted in the thermistor mounting portions 2. Incidentally, when the front side of the casing 3 is turned out, the opening portions 80 of the voltage detection line housing portions 8 are closed with a working table or the like so that a worker cannot observe the opening portions 80. Therefore, there is no fear that the thermistor lines 5 may be inserted to the voltage detection line housing portions 8 by mistake. In this procedure, the battery connection body 1 is assembled. The battery connection body 1 assembled in the procedure is placed on the battery assembly 11 and the connection conductors 12 are electrically connected to the electrodes of the battery cells by laser welding.

In the battery pack 10 provided with the battery connection body 1, the voltage detection line housing portions 8 and the thermistor line housing portions 9 are provided in the casing 3 so that the voltage detection lines 4 and the thermistor lines 5 can be separated from each other. Thus, noise propagation from the voltage detection lines 4 to the thermistor lines 5 can be prevented from occurring easily. In addition, the voltage detection line housing portions 8 and the thermistor line housing portions 9 are provided adjacently to each other and the housing portions 8 and 9 are defined (divided) by a part of the casing 3. It is therefore possible to miniaturize and simplify the casing 3.

In a background-art battery connection body in which a voltage detection line housing portion is open on the front side of a casing, it is necessary to cover the opening portion of the voltage detection line housing portion with a cover or the like. However, in the battery pack 10 provided with the battery connection body 1, the voltage detection lines 4 housed in the voltage detection line housing portions 8 are shielded by the voltage detection line housing portions 8 and the battery assembly 11. The cover for covering the voltage detection lines 4 does not have to be provided either on the front side of the casing 3 or on the back side of the same. Even when the opening portions of the connection conductor mounting portions 7 or the thermistor line housing portions 9 must be covered with a cover on the front side of the casing 3, the cover may have a structure in which the opening portions of the connection conductor mounting portions 7 or the thermistor line housing portions 9 can be partially covered with the cover, but a portion for covering the voltage detection lines 4 is not necessary. That is, the cover does not have to cover the whole of the front side of the casing 3. It is therefore possible to simplify the structure of the battery connection body 1.

In addition, the battery connection body 1 has a structure in which the voltage detection lines 4 can be received into the voltage detection line housing portions 8 from the back side of the casing 3, and the thermistor lines 5 can be received into the thermistor line housing portions 9 from the front side of the casing 3. Those lines 4 and 5 can be wired in the respective housing portions 8 and 9 easily and surely, so that they can be prevented from being wired by mistake. Further, the battery connection body 1 has a structure in which the voltage detection lines 4 are connected to the connection conductors 12, and both the connection conductors 12 and the voltage detection lines 4 can be attached to the casing 3 from the back side of the casing 3. It is therefore possible to perform the work of assembling the battery connection body 1 easily.

In addition, the connection conductors 12 have a structure in which they connect all the battery cells of the battery assembly 11 in series. However, connection conductors according to the invention may include a structure in which they connect the battery cells in parallel.

(First Modification)

Figure 7:
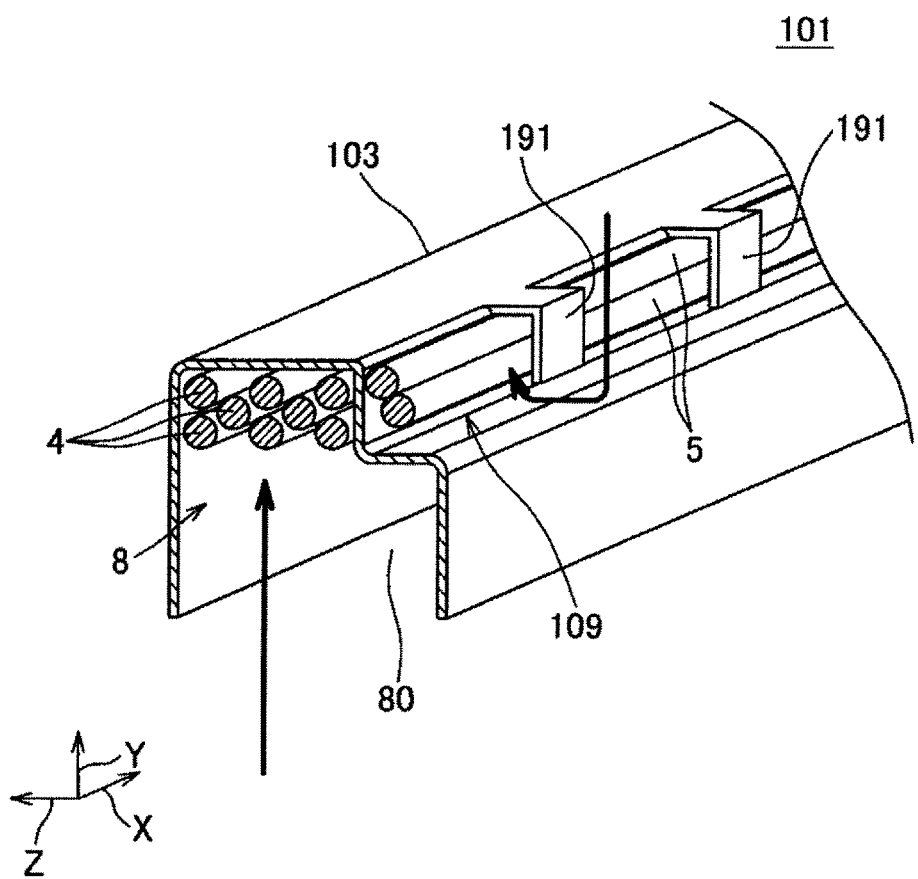
FIG. 7 is an explanatory view showing a first modification of the battery connection body shown in FIG. 1.

FIG. 7 is an explanatory view showing a first modification of the battery connection body 1. In a casing 103 of a battery connection body 101 shown in FIG. 7, a thermistor line housing portion 109 is provided in place of the thermistor line housing portion 9. The thermistor line housing portion 109 is defined by a space at the side of the voltage detection line housing portion 8, and holding claws 191 for holding the thermistor lines 5 in the space.

(Second Modification)

Figure 8:
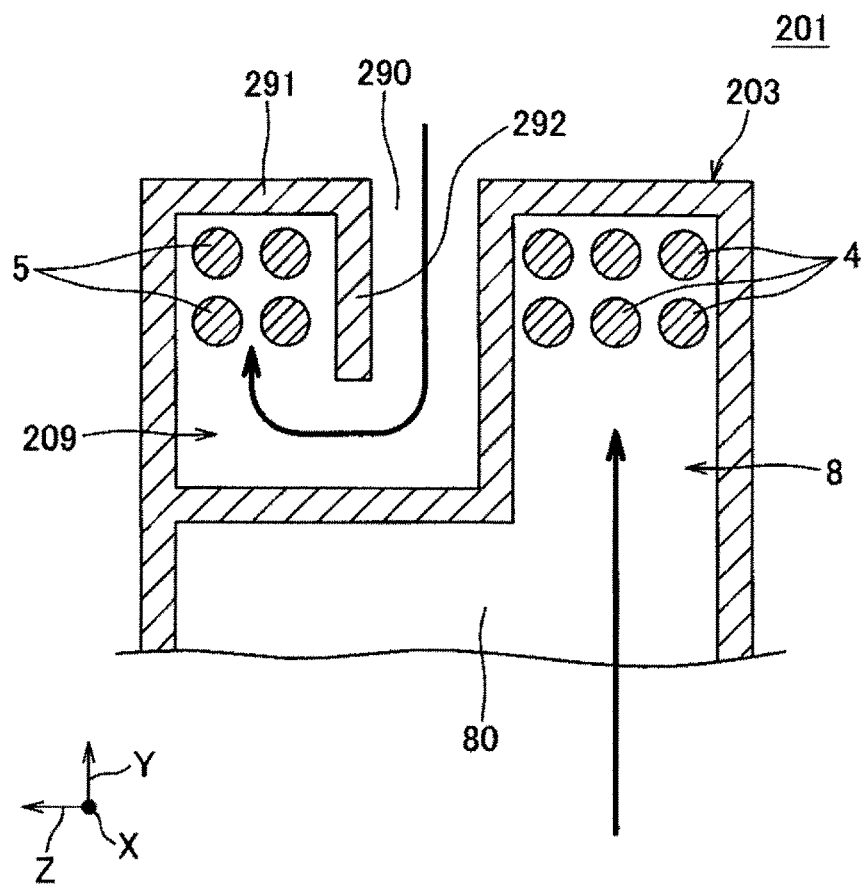
FIG. 8 is an explanatory view showing a second modification of the battery connection body shown in FIG. 1.

FIG. 8 is an explanatory view showing a second modification of the battery connection body 1. In a casing 203 of a battery connection body 201 shown in FIG. 8, a thermistor line housing portion 209 is provided in place of the thermistor line housing portion 9. The thermistor line housing portion 209 is formed into a gutter-like shape and adjacently to the voltage detection line housing portion 8. In addition, in the thermistor line housing portion 209, a wall 291 closing almost half an opening portion 290 of the thermistor line housing portion 209, and a wall 292 extending downward and continuously to an end portion of the wall 291 are provided in place of the flexible claws 91. The thermistor line housing portion 209 is formed as a labyrinth structure by the walls 291 and 292 so that the thermistor lines 5 housed therein cannot emerge to the outside easily.

In addition, the above-described embodiment shows a structure in which the connection conductors 12 are mounted into the connection conductor mounting portions 7 from the back side of the casing 3, 103 or 203, and the voltage detection lines 4 are received into the voltage detection line housing portions 8 from the back side of the casing 3, 103 or 203 while the thermistor lines 5 are received into the thermistor line housing portions 9, 109 or 209 from the front side of the casing 3, 103 or 203. According to the invention, however, the structure may be arranged so that connection conductors are mounted into connection conductor mounting portions from the front side of a casing and voltage detection lines are received into voltage detection line housing portions from the front side of the casing while thermistor lines are received into thermistor line housing portions from the back side of the casing.

In addition, the case where the "first electric wires" are voltage detection lines 4 and the "second electric wires" are thermistor lines 5 has been described in the above-described embodiment. However, the "first electric wires" and the "second electric wires" are not limited to those applications. That is, it will go well if a battery connection body includes "first electric wires" and "second electric wires" different in application and a lower voltage than the maximum value in the "first electric wires" is applied to the "second electric wires".

Incidentally, the above-described embodiment is simply shown as representative embodiments of the invention. The invention is not limited to the embodiment. That is, various changes or modifications may be made without departing from the scope of the invention.

What is claimed is:

1. A battery connection body comprising:
a plurality of connection conductors which electrically connect respective battery cells forming a battery assembly;
a casing to which the connection conductors are mounted, and which comprises a first side and a second side different from the first side; and
a plurality of first electric wires and a plurality of second electric wires, which are wired in the casing,
wherein the casing comprises:
a connection conductor mounting portion;
a first electric wire housing portion; and
a second electric wire housing portion,
wherein the first side of the casing is opposite to the second side of the casing in a direction perpendicular to a longitudinal arrangement of the plurality of the first and second electric wires,
wherein the connection conductors are mounted to the connection conductor mounting portion from the first side of the casing,
wherein the first electric wires are configured to be received into the first electric wire housing portion from a first direction,
wherein the second electric wires are configured to be received into the second electric wire housing portion from a second direction opposite to the first direction, and
wherein the electric wires are voltage detection lines and the second electric wires are thermistor lines.

2. The battery connection body according to claim 1, wherein the first side of the casing is a back side of the casing, and
wherein the second side of the casing is a front side of the casing.

3. The battery connection body according to claim 1, wherein the first electric wire housing portion and the second electric wire housing portion are provided adjacently to each other, and
wherein the first electric wire housing portion and the second electric wire housing portion are defined by a part of the casing.

4. The battery connection body according to claim 1, wherein the first electric wires are connected to the connection conductors.

5. A battery pack comprising:
the battery connection body according to claim 1; and
the battery assembly in which the battery cells are electrically connected by the battery connection body.

6. The battery pack according to claim 5,
wherein the first electric wire housing portion has at least three sides to secure the first electric wires and an opening portion that is open on the first side of the casing, and
wherein the opening portion is closed with the battery assembly.

7. The battery pack according to claim 1, wherein the case further comprises:
a plurality of thermistor mounting portions arranged at a plurality of places in the longitudinal direction.

8. The battery pack according to claim 7, wherein the thermistor mounting portions are provided with two guide grooves.

9. The battery pack according to claim 8, wherein the thermistor mounting portions house thermistors having two guide ribs corresponding to the two guide grooves.

10. The battery pack according to claim 1, wherein the second electric wire housing portion includes claws for holding the second electric wires in place.

11. The battery pack according to claim 1, wherein the second electric wire housing includes a wall closing a portion of the second electric wire housing to secure the second electric wires.

\* \* \* \* \*